(12) United States Patent
Miettinen et al.

(10) Patent No.: US 11,487,358 B1
(45) Date of Patent: Nov. 1, 2022

(54) DISPLAY APPARATUSES AND METHODS FOR CALIBRATION OF GAZE-TRACKING

(71) Applicant: Varjo Technologies Oy, Helsinki (FI)

(72) Inventors: Ville Miettinen, Helsinki (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 50 days.

(21) Appl. No.: 17/233,707

(22) Filed: Apr. 19, 2021

(51) Int. Cl.
*G06F 3/01* (2006.01)
*G06V 40/18* (2022.01)

(52) U.S. Cl.
CPC ............ *G06F 3/013* (2013.01); *G06V 40/193* (2022.01)

(58) Field of Classification Search
CPC .............................. G06F 3/013; G06V 40/193
USPC .......................................................... 382/103
See application file for complete search history.

(56) References Cited

U.S. PATENT DOCUMENTS

| | | | |
|---|---|---|---|
| 10,108,261 B1 * | 10/2018 | Hall | G06F 3/013 |
| 10,466,779 B1 * | 11/2019 | Liu | H04N 5/2256 |
| 10,884,494 B1 * | 1/2021 | Lagies | G06F 3/013 |
| 2015/0331485 A1 | 11/2015 | Wilairat et al. | |
| 2016/0029883 A1 * | 2/2016 | Cox | G06F 3/013 |
| | | | 351/209 |
| 2020/0043236 A1 | 2/2020 | Miller et al. | |
| 2020/0126283 A1 * | 4/2020 | van Vuuren | G06T 17/20 |
| 2021/0026445 A1 * | 1/2021 | Stoner | G06F 3/015 |

OTHER PUBLICATIONS

Notification of Transmittal of The International Search Report and The Written Opinion of The International Searching Authority, or The Declaration, Application No. PCT/FI2022/050208, dated Jun. 28, 2022, 16 pages.

* cited by examiner

*Primary Examiner* — Gabriel I Garcia
(74) *Attorney, Agent, or Firm* — Ziegler IP Law Group, LLC

(57) ABSTRACT

A display apparatus including: light source(s); camera(s); and processor(s) configured to: display extended-reality image for presentation to user, whilst capturing eye image(s) of user's eyes; analyse eye image(s) to detect eye features; employ existing calibration model to determine gaze directions of user's eyes; determine gaze location of user; identify three-dimensional bounding box at gaze location within extended-reality environment, based on position and optical depth of gaze location; identify inlying pixels of extended-reality image lying within three-dimensional bounding box, based on optical depths of pixels in extended-reality image; compute probability of user focussing on given inlying pixel and generate probability distribution of probabilities computed for inlying pixels; identify at least one inlying pixel calibration target, based on probability distribution; and map position of calibration target to eye features, to update existing calibration model to generate new calibration model.

20 Claims, 2 Drawing Sheets

DISPLAY APPARATUSES AND METHODS FOR CALIBRATION OF GAZE-TRACKING

TECHNICAL FIELD

The present disclosure relates to display apparatuses for calibration of gaze-tracking. Moreover, the present disclosure relates to methods for calibration of gaze tracking.

BACKGROUND

Nowadays, extended reality (XR) technologies (for example, such as virtual reality (VR), augmented reality (AR), mixed reality (MR), and the like) are being developed and improved for presenting an XR environment to a user. Typically, the user uses an XR device for experiencing and interacting with the XR environment. In use, the user generally wears (namely, supports) the XR device on his/her head.

Typically, the XR device includes specialized gaze-tracking (namely, eye tracking) equipment to track the user's gaze. The tracked gaze of the user can be used for various functions such as facilitating the XR device to closely implement gaze contingent foveated rendering, collecting information about the user's object(s) of interest within the XR environment, and the like. Prior to each use of the XR device, the gaze-tracking equipment is required to be calibrated. Existing calibration solutions employed in the XR device for calibration of gaze-tracking typically involve instructing the user to look at targets (for example, such as dots, distinctly-shaped targets, or similar) in a displayed image, wherein position coordinates of the targets are pre-known; capturing images of the user's eyes whilst he/she gazes at the targets; and mapping eye features represented in the captured images to the position coordinates for determining gaze directions of the user's eyes whilst the user is focussing on the targets. These calibration solutions range from low-quality zero/one target calibrators to full-fledged calibrators involving many targets (for example, about 50 targets).

However, these existing calibration solutions suffer from certain limitations. Firstly, as the existing calibration solutions are heavily based on manual calibration, calibration process requires active participation of the user. The calibration process can therefore take considerable time, ranging from several seconds to several minutes. Moreover, as calibration is required every time the user uses the XR device, such time-consuming manual calibration annoys the user and is a serious show-stopper for the adoption of gaze-tracking. Secondly, some existing calibration solutions that use smaller number of targets and strengthen gaze-tracking fits using large collected calibration databases (involving dozens or hundreds of trial participants) are cumbersome to implement. As an example, collecting the calibration databases is expensive, and needs to be done separately for each generation of the XR device. Therefore, such calibration solutions are unpopular and find very limited use.

Therefore, in light of the foregoing discussion, there exists a need to overcome the aforementioned drawbacks associated with calibration of gaze-tracking in XR devices.

SUMMARY

The present disclosure seeks to provide a display apparatus for calibration of gaze-tracking. The present disclosure also seeks to provide a method for calibration of gaze-tracking. An aim of the present disclosure is to provide a solution that overcomes at least partially the problems encountered in prior art.

In one aspect, an embodiment of the present disclosure provides a display apparatus comprising:
  at least one light source;
  at least one camera; and
  at least one processor configured to:
    display an extended-reality image via the at least one light source for presentation to a user, whilst capturing at least one eye image of the user's eyes via the at least one camera;
    analyse the at least one eye image to detect eye features therein;
    employ an existing calibration model to determine gaze directions of the user's eyes, based on the detected eye features;
    determine a gaze location at which the user is gazing, based on an intersection of the gaze directions;
    identify a three-dimensional bounding box at the gaze location within an environment being presented via the extended-reality image, based on a position and an optical depth of the gaze location within the environment;
    identify a set of inlying pixels of the extended-reality image that lie within the three-dimensional bounding box, based on optical depths of pixels in the extended-reality image;
    compute a probability of the user focussing on a given inlying pixel of said set and generate a probability distribution of probabilities computed for the inlying pixels of said set;
    identify at least one inlying pixel in said set as a calibration target, based on the probability distribution; and
    map a position of the calibration target to the detected eye features, so as to update the existing calibration model to generate a new calibration model.

In another aspect, an embodiment of the present disclosure provides a method for calibration of gaze tracking, the method comprising:
  displaying an extended-reality image via at least one light source for presentation to a user, whilst capturing at least one eye image of the user's eyes via at least one camera;
  analysing the at least one eye image to detect eye features therein;
  employing an existing calibration model to determine gaze directions of the user's eyes, based on the detected eye features;
  determining a gaze location at which the user is gazing, based on an intersection of the gaze directions;
  identifying a three-dimensional bounding box at the gaze location within an environment being presented via the extended-reality image, based on a position and an optical depth of the gaze location within the environment;
  identifying a set of inlying pixels of the extended-reality image that lie within the three-dimensional bounding box, based on optical depths of pixels in the extended-reality image;
  computing a probability of the user focussing on a given inlying pixel of said set and generating a probability distribution of probabilities computed for the inlying pixels of said set;
  identifying at least one inlying pixel in said set as a calibration target, based on the probability distribution; and mapping a position of the calibration target to the detected eye features, so as to update the existing calibration model to generate a new calibration model.

Embodiments of the present disclosure substantially eliminate or at least partially address the aforementioned problems in the prior art, and enable accurate and dynamic calibration of gaze tracking, with minimal user participation.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
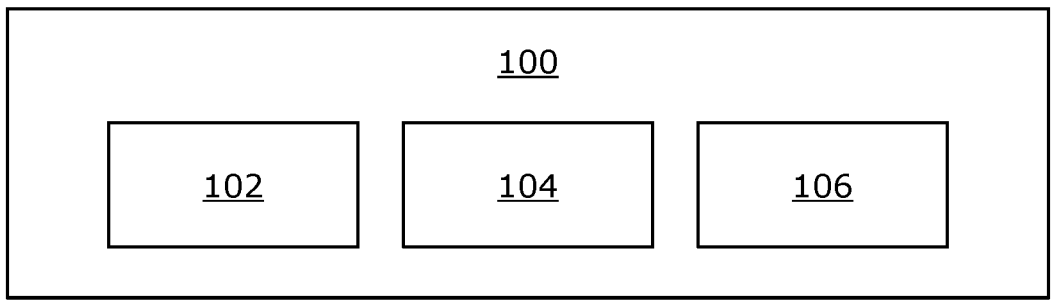
FIG. 1 illustrates a block diagram of an architecture of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
at least one light source;
at least one camera; and
at least one processor configured to:
  display an extended-reality image via the at least one light source for presentation to a user, whilst capturing at least one eye image of the user's eyes via the at least one camera;
  analyse the at least one eye image to detect eye features therein;
  employ an existing calibration model to determine gaze directions of the user's eyes, based on the detected eye features;
  determine a gaze location at which the user is gazing, based on an intersection of the gaze directions;
  identify a three-dimensional bounding box at the gaze location within an environment being presented via the extended-reality image, based on a position and an optical depth of the gaze location within the environment;
  identify a set of inlying pixels of the extended-reality image that lie within the three-dimensional bounding box, based on optical depths of pixels in the extended-reality image;
  compute a probability of the user focussing on a given inlying pixel of said set and generate a probability distribution of probabilities computed for the inlying pixels of said set;
  identify at least one inlying pixel in said set as a calibration target, based on the probability distribution; and
  map a position of the calibration target to the detected eye features, so as to update the existing calibration model to generate a new calibration model.

In another aspect, an embodiment of the present disclosure provides a method for calibration of gaze tracking, the method comprising:
  displaying an extended-reality image via at least one light source for presentation to a user, whilst capturing at least one eye image of the user's eyes via at least one camera;
  analysing the at least one eye image to detect eye features therein;
  employing an existing calibration model to determine gaze directions of the user's eyes, based on the detected eye features;
  determining a gaze location at which the user is gazing, based on an intersection of the gaze directions;
  identifying a three-dimensional bounding box at the gaze location within an environment being presented via the extended-reality image, based on a position and an optical depth of the gaze location within the environment;
  identifying a set of inlying pixels of the extended-reality image that lie within the three-dimensional bounding box, based on optical depths of pixels in the extended-reality image;
  computing a probability of the user focussing on a given inlying pixel of said set and generating a probability distribution of probabilities computed for the inlying pixels of said set;
  identifying at least one inlying pixel in said set as a calibration target, based on the probability distribution; and
  mapping a position of the calibration target to the detected eye features, so as to update the existing calibration model to generate a new calibration model.

The present disclosure provides the aforementioned display apparatus and the aforementioned method for calibration of gaze tracking. The display apparatus is easy to implement and use, and utilizes a dynamic calibration model for accurate and easy calibration of gaze tracking. This dynamic calibration model is repeatedly improved over time, based on newly identified calibration targets at each iteration. In a given iteration, the dynamic calibration model is improved based on the identified calibration target whose position and optical depth in the environment is exactly known, but the probability that the user is actually looking at it is less than 100 percent. Such identified calibration target is used as an input for updating the existing calibration model to generate the new calibration model. The method is fully automated and does not require the user's active participation. Moreover, the method converges quickly (as bounds of the three-dimensional bounding box decrease at each iteration) and produces better (i.e., more accurate) calibration mappings than even the most extensive existing calibration techniques. The at least one processor required for performing the computations described herein for calibration has low cost, and is easy to implement. The method is lightweight enough to be implemented on embedded processor(s), thereby enabling its use even on non-tethered display apparatuses. Moreover, the method can easily be integrated with existing calibration solutions (for example, such as dot-based calibration solutions).

Throughout the present disclosure, the term "display apparatus" refers to a display system that is configured to present an extended-reality (XR) environment to the user when the display apparatus in operation is used by the user. In operation, the display apparatus displays XR images to present the XR environment. This XR environment is the environment that is being presented via the XR image. Moreover, the term "extended-reality" encompasses virtual reality (VR), augmented reality (AR), mixed reality (MR), and the like.

In one implementation, the display apparatus is implemented as a head-mounted device (HMD) and a computer coupled to the HMD. In one case, the HMD comprises the at least one light source and the at least one camera, while the computer comprises the at least one processor. Therefore, computational tasks pertaining to presentation of the XR environment are entirely performed at the computer, by the at least one processor. In another case, the HMD comprises the at least one light source and the at least one camera, and the at least one processor is implemented at both the HMD and the computer. Therefore, computational tasks pertaining to presentation of the XR environment are performed in a shared manner at both the HMD and the computer, by the at least one processor. The computer may be coupled to the HMD wirelessly and/or in a wired manner. Examples of the computer include, but are not limited to, a desktop computer, a laptop computer, a tablet computer, a workstation, and an XR console.

In another implementation, the display apparatus is implemented as an HMD. In such a case, the HMD comprises the at least one light source, the at least one camera, and the at least one processor. Therefore, computational tasks pertaining to presentation of the XR environment are entirely performed at the HMD, by the at least one processor.

It will be appreciated that the HMD is worn by the user on his/her head. The HMD is implemented, for example, as an XR headset, a pair of XR glasses, and the like, that is operable to display a visual scene of the XR environment to the user.

Throughout the present disclosure, the term "light source" refers to an element from which light emanates. Optionally, a given light source is implemented as a display. In this regard, a given XR image is displayed at the given light source. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, a given XR image is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector.

In some implementations, separate light sources are employed to display XR images to a left eye and a right eye of a user. In other implementations, a single light source is employed on a shared basis to display XR images for both the eyes of the user. In these other implementations, optionally, the display apparatus further comprises at least one reflective element to direct a projection of a given XR image towards a corresponding eye of the user. Optionally, the at least one reflective element is implemented as at least one of: a mirror, a reflective liquid lens, a reflective liquid-crystal (LC) lens, a reflective membrane. Optionally, the display apparatus further comprises at least one optical element arranged on an optical path between the at least one reflective element and a user's eye, the at least one optical element being arranged to indirectly reflect the projection of the given XR image from the at least one reflective element towards the retina of the user's eye. Optionally, the at least one optical element is implemented as at least one of: one or more lenses, one or more mirrors, a prism, a beam splitter, an optical waveguide, a polarizer. When the at least one optical element is implemented as a configuration of one or more lenses, said configuration may, for example, comprise at least one of: a convex lens, a planoconvex lens, a concave lens, a planoconcave lens, a Liquid Crystal (LC) lens, a liquid lens, a Fresnel lens, an achromatic lens, a meniscus lens, a nano-grating lens.

Optionally, a given light source could be a multi-resolution light source, or a single-resolution light source. Multi-resolution light sources are configured to display images at two or more resolutions, whereas single-resolution light sources are configured to display images at a single resolution only.

The at least one camera captures the at least one eye image of the user's eyes. Notably, the at least one eye image is representative of eye features of the user's eyes. The at least one eye image of the user's eyes could be either a single eye image of both the eyes or separate eye images of the left eye and the right eye. Optionally, the at least one camera is implemented as at least one visible light camera. Examples of a given visible light camera include, but are not limited to, a Red-Green-Blue (RGB) camera, and a monochrome camera. It will be appreciated that the given visible light camera could also be implemented as a multispectral camera, a hyperspectral camera, or similar. In some implementations, separate cameras are employed to capture separate eye images of the left eye and the right eye of the user. In other implementations, a single camera is employed to capture an eye image of both the eyes of the user.

Optionally, the display apparatus further comprises at least one video see-through (VST) camera for capturing at least one real-world image of a real-world environment whereat the user is present. The at least one VST camera is arranged on the HMD in a manner that the at least one VST camera faces the real-world environment. Optionally, the at least one real-world image is utilized for generating the XR image. Optionally, the at least one video see-through (VST) camera is implemented as at least one visible light camera.

Optionally, the display apparatus further comprises at least one depth camera for capturing at least one depth image of objects present in the real-world environment. Optionally, the at least one depth image is utilized for generating the XR image. Optionally, the optical depths of pixels in the XR image are determined using the at least one depth image. Alternatively, optionally, the optical depths of pixels in the XR image are determined using binocular disparities of matching pixels in at least one pair of stereo images. Examples of a given depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. It will be appreciated the at least one VST camera and the at least one depth camera may also be implemented in combination, for example, as the stereo camera.

The at least one processor is at least coupled to, and controls operation of, the at least one light source and the at least one camera. The at least one processor performs steps of the method to enable efficient, fast, accurate, and automated calibration for gaze-tracking.

When the at least one eye image is captured whilst presenting the XR image to the user, the at least one eye image represents how the user's eyes focus on the environment (i.e., the XR environment) being presented via the XR image. The user's eyes would focus differently on different regions in the environment, depending on positions and optical depths of these regions in the environment. Optionally, the at least one processor is configured to generate the XR image. Alternatively, optionally, at least one processor is communicably coupled to a rendering server, wherein the rendering server is configured to: generate the XR image, and send the XR image to the at least one processor for displaying. Optionally, the rendering server is implemented at the computer coupled to the HMD.

Optionally, when analysing the at least one eye image to detect eye features therein, the at least one processor is configured to employ at least one image processing algorithm. Examples of the at least one image processing algorithm include, but are not limited to, a feature extraction algorithm, a glint detection algorithm, a feature shape detection algorithm, and an image correction algorithm. Examples of the at least one image processing algorithm include, but are not limited to, an edge-detection algorithm, a corner-detection algorithm, a blob-detection algorithm, a feature descriptor algorithm, a feature detector algorithm, an image brightening/darkening algorithm, and an image sharpening algorithm. Such image processing algorithms are well-known in the art.

Optionally, the eye features represented in the at least one eye image comprise at least one of: sizes and shapes of pupils, glints of each eye, relative positions of pupils with respect to glints, relative positions of pupils with respect to corners of the user's eyes. Typically, a shape of a pupil of a user's eyes is circular, but may also be elliptical, deformed circular, or similar. Herein, the term "glint" refers to a corneal reflection of the at least one light source in the user's eyes.

Optionally, the at least one processor is configured to generate the existing calibration model is by instructing the user to look at test calibration targets in an initial XR image, wherein position coordinates of the test calibration targets are pre-known; capturing, via the at least one camera, at least one initial eye image of the user whilst he/she gazes at the test calibration targets; and mapping the detected initial eye features represented in the at least one initial eye image to the position coordinates of the test calibration targets to determine gaze vectors for the user's eyes, wherein the gaze vectors represent the gaze directions of the user's eyes whilst the user is focussing on the test calibration targets. The generation of the existing calibration model involves participation of the user, and is required to be performed at the beginning of every viewing session of the display apparatus when the user wears the HMD on his/her head. It will be appreciated that greater the number of the test calibration targets, greater is the quality of the existing calibration model. Moreover, greater the number of the test calibration targets, greater is a time duration for generating the existing calibration model, as several seconds are required to calibrate according to each test calibration target. Beneficially, the existing calibration model is generated using a low number of test calibration targets (for example, zero/one test calibration targets, or similar), so that user participation is minimal and initial calibration process (using the existing calibration model) is performed extremely quickly. Optionally, the existing calibration model is a high-quality calibration model using a high number of test calibration targets (for example, 5-50 test calibration targets, or similar). In such a case, the existing model is further refined using the method described herein. It will be appreciated that the existing calibration model can be any viable calibration model.

Optionally, when mapping the detected initial eye features to the position coordinates of the test calibration targets, the at least one processor employs at least one statistical modelling technique. The at least one statistical modelling technique models a relationship between the detected initial eye features and the position coordinates of the test calibration targets. In particular, the at least one statistical modelling technique models a relationship between the gaze directions of the user's eyes corresponding to the position coordinates of the test calibration targets. For example, the at least one statistical modelling technique may be a polynomial fitting technique. In the polynomial fitting technique, a relationship (or a mapping) between a position coordinate of a test calibration target and gaze directions of the user's eyes whilst focussing on the test calibration target is modelled as an nth degree polynomial.

The existing calibration model is employed to perform an initial analysis of the gaze directions of the user's eyes, which is then improved using the subsequently generated new calibration model. The existing calibration model serves as an initial frame of reference that is employed to determine the gaze directions of the user's eyes, based on the detected eye features.

The term "gaze location" refers to a location in the XR environment at which the user is gazing. The intersection of the gaze directions (which collectively constitute stereo gaze information of both the user's eyes) accurately gives said location in the XR environment. The gaze location could be a two-dimensional (2D) location or a three-dimensional (3D) location in the XR environment being presented in the XR image. The gaze location is where the 3D bounding box is subsequently identified.

Optionally, the gaze location at which the user is gazing is determined, based also on pre-known information of the environment being presented via the XR image. When the environment includes an object and/or a user-interface element that the user is interacting with, the at least one processor deduces that the gaze location is a location of the object and/or the user-interface element. The object could be a virtual object (namely, a computer-generated object) or a real-world object. The user interface element may, for example, be an icon (at which the user is instructed to look, for example), a click button, or similar.

Optionally, when identifying the 3D bounding box at the gaze location, the at least one processor is configured to:
extract framebuffer data of a colour buffer and a depth buffer that drive the at least one light source, wherein the extracted framebuffer data corresponds to the position and the optical depth of the gaze location; and
generate a 3D model using the extracted framebuffer data, the 3D model including points lying within the 3D bounding box. It will be appreciated that the 3D model could be generated in any 3D data format (for example, such as a 3D point cloud, triangles, voxels, and the like).

Throughout the present disclosure, the term "3D bounding box" refers to a three-dimensional region at the gaze location within the environment. The 3D bounding box can be understood to be a sampling region for identifying the calibration target. Optionally, when identifying the 3D bounding box at the gaze location, the at least one processor is configured to select 3D bounds of the 3D bounding box about the position and the optical depth of the gaze location. These 3D bounds may, for example, be expressed in terms of angular sizes (namely, angular extents) along three dimensions of the 3D bounding box, in an angular space of the environment. It will be appreciated that the 3D bounds of the 3D bounding box are selected in a manner that the 3D bounding box is fairly small in size.

Optionally, an angular size of the 3D bounding box along a given dimension lies in a range of 0.1 to 2 degrees. For example, the angular size may be from 0.1, 0.2, 0.3, 0.4, 0.5, 0.6, 0.7, 0.8, 0.9, 1, 1.1, 1.2, 1.3, 1.4, 1.5, 1.6, 1.7, 1.8 or 1.9 degrees up to 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 degrees. The selection of the angular size optionally also takes into account error bounds of the intersections of the gaze directions. Moreover, the 3D bounds of the 3D bounding box decrease with each iteration of the method, as the existing calibration model is iteratively updated to generate improvised new calibration models.

In an example, when an angular resolution at a region of the XR image that represents the gaze location is 60 PPD and a horizontal angular size and a vertical angular size of the 3D bounding box are both equal to 2 degrees, a number of pixels in the XR image representing visual content corresponding to the 3D bounding box is equal to 14400 pixels (as 120*120 pixels equals 14400 pixels).

Optionally, the position and/or the optical depth of the gaze location within the environment is determined using a three-dimensional environment map of the environment. Alternatively, optionally, the position and/or the optical depth of the gaze location within the environment is determined using framebuffer data of the colour buffer and/or the depth buffer, respectively, that drive the at least one light source. Optionally, in this regard, the framebuffer data is post-reprojection framebuffer data. This post-reprojection framebuffer data is generated, by the at least one processor, upon reprojection (namely, space/time warping) of the XR image.

Throughout the present disclosure, the term "inlying pixel" refers to a pixel of the XR image that represents a region of the environment lying within the 3D bounding box. It will be appreciated that optical depths of different pixels in the XR image may be different. Therefore, only those pixels of the XR image that have positions within the 3D bounding box and have optical depths lying in a range of optical depths (namely, depth bounds) of the 3D bounding box are identified as inlying pixels. Only a small region of the post-reprojection framebuffer data is required to be fetched for each eye. This small region is a region that includes and surrounds the gaze location of the user. Optionally, when identifying the set of inlying pixels, the at least one processor is configured to reject all outlying pixels of the XR image that lie outside of the 3D bounding box.

Optionally, when computing the probability of the user focussing on the given inlying pixel, the at least one processor employs at least one mathematical formula. The probability is computed based on at least one of: stereo focussing (by the user's eyes), motion matching, saliency of features. Optionally, the probability lies in a range of 0 to 1. The probability may, for example, be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1. It will be appreciated that the probability may also be expressed as a percentage. For example, the probability of 0.7 may be expressed as 70 percent.

The probability distribution of the probabilities computed for the inlying pixels of the set defines a probability field for the inlying pixels of the set. Optionally, the at least one processor is configured to assign weights to the inlying pixels of the set based on their corresponding probabilities, wherein, when identifying the at least one inlying pixel as the calibration target, the at least one processor is configured to compute a 3D centre of mass of the probability distribution using the assigned weights, wherein the at least one inlying pixel that is identified as the calibration target corresponds to the 3D centre of mass of the probability distribution.

In this regard, the 3D centre of mass is a weighted average of the corresponding probabilities of the inlying pixels of the set. Optionally, the at least one inlying pixel whose position lies nearest to a position of the 3D centre of mass, is identified as the calibration target. Optionally, a weight assigned to a given inlying pixel is equal to 1 divided by a weighted variance of 3D position coordinates of the given inlying pixel to 3D position coordinates of the 3D centre of mass. The weight may be computed separately for different axes, and may exhibit an anisotropic trend along the different axes. Optionally, a distribution of the at least one inlying pixel in a 3D coordinate space is a Gaussian distribution. In this regard, the weight to be assigned to the given inlying pixel may, for example, be calculated as a function of a distance between the given inlying pixel and the 3D centre of mass. Mathematically, weight=exp(−(max(distance(3D position of inlying pixel,3D position of 3D centre of mass)−bias, 0.0)*scaleBias))

wherein optimal bias terms (i.e., bias and scaleBias) are determined using regression of actual calibration data. The aforesaid function for calculating the weight, which is in form of exp(−x) is an exemplary dampening function (at x=0, it has the value of 1, and then it gradually descends to 0). Such a function tends to have fast native implementations in the floating-point units of processors. Notably, any other dampening function, such as 1/(a*x*x+b*x+1) could be used instead of the aforesaid function, for calculating the weight. The bias and scale bias are selected according to data.

Assignment of the weight to the at least one inlying pixel yields an improved probability distribution. It will be appreciated that the weight assigned to the given inlying pixel may could also be determined using 2D position coordinates of the given inlying pixel and the 3D centre of mass, in a similar manner as described hereinabove.

It will be appreciated that one eye image corresponds to one pair of the gaze directions (for the left and right eyes of the user). Therefore, a single calibration point is identified per eye image. This single calibration point may be represented by the at least one inlying pixel in said set. Optionally, in the probability distribution, at least one inlying pixel for which computed probabilities is highest is identified as the calibration target. As an example, an inlying pixel corresponding to the 3D centre of mass of the probability distribution may be considered as the calibration target. It will be appreciated that the calibration target is identified when a number of inlying pixel(s) actually gazed at by the user is smaller than error bounds of calibration at that spot in the environment. The XR image used for identifying the calibration target keeps changing, as a frame rate of displaying images is generally quite high (to provide a feeling of immersiveness and realism in the XR environment) and/or the user moves his/her head. Therefore, for a given XR image, the user would at most look at one spot in the environment, and the at least one inlying pixel corresponding to that spot is identified as the calibration target.

Optionally, the at least one processor does not identify any inlying pixel in said set as the calibration target. This situation occurs when the computed probabilities in the probability distribution are too low (for example, when the computed probabilities are below a minimum acceptable threshold value). In such a case, the XR image is not utilized for identification of the calibration target.

The position of the calibration target could be expressed as 2D position coordinates or as 3D position coordinates of the calibration target in a 2D coordinate space or a 3D coordinate space, respectively. By the phrase "map the position of the calibration target to the detected eye features", it is meant that there is established an association between the position of the calibration target and the detected eye features. This mapping defines how the eye features of the user appear when the user gazes at the position of the calibration target. Therefore, this mapping is used for updating the existing calibration model to generate the new calibration model, which would have a better accuracy as compared to the existing calibration model. The new calibration model includes this mapping for the calibration target, which the existing calibration model did not include. The calibration target is used as an additional input for fitting (namely, improving) the existing calibration model or in lieu of calibration points in the existing calibration model. This process is performed repeatedly to update existing calibration models to generate more enriched and accurate new calibration models. The new calibration model is employed during operation of the display apparatus so as to re-calibrate gaze tracking as well as to perform drift correction in gaze tracking.

Optionally, updating the existing calibration model involves fitting observations to the new calibration model. This fitting can be a probability-weighted polynomial fit and can be performed using Gaussian Elimination or Single-Value Decomposition. As an example, the observations may be fit to a low-degree polynomial (for example, a polynomial of the order of about 10 coefficients). Optionally, prior to updating the existing calibration model, the at least one processor is configured to run a Random Sample Consensus (RANSAC) pass to remove outliers. It will be appreciated that the step of updating the existing calibration model can be executed really fast (for example, in less than 1 millisecond on a single core processor), and therefore the existing calibration model can be updated multiple times per second. Beneficially, the 3D bounds of the 3D bounding box decrease with each iteration updating of the existing calibration model, as these 3D bounds come directly from error bounds of calibration fitting, and the error bounds reduce as the fitting improves iteratively. The new calibration model provides a significant improvement in calibrating over conventional calibration models.

Moreover, the 3D bounds of the 3D bounding box decrease with each iteration of the method, as the existing calibration model is iteratively updated to generate improvised new calibration models.

Motion Matching

Optionally, the at least one processor is configured to:
determine, for a given inlying pixel of said set, a motion vector of a corresponding three-dimensional point in the environment that is represented by the given inlying pixel;
determine a motion vector of the user's gaze;
detect whether or not an angle between the motion vector of the corresponding three-dimensional point and the motion vector of the user's gaze exceeds a predefined threshold angle; and
when it is detected that the angle between the motion vector of the corresponding three-dimensional point and the motion vector of the user's gaze exceeds the predefined threshold angle, discard the given inlying pixel from said set.

Optionally, the motion vector of the corresponding 3D point in the environment that is represented by the given inlying pixel is determined by comparing the XR image representing the given inlying pixel to at least one previous XR image representing the given inlying pixel. The motion vector of the corresponding 3D point is indicative of a magnitude and a direction of motion of the 3D point (i.e., an optical flow of the 3D point) represented by the given inlying pixel across these XR images.

Optionally, the motion vector of the user's gaze is determined by comparing the gaze directions of the user's eyes with at least one previous gaze directions of the user's eyes. The motion vector of the user's gaze is indicative of a magnitude and a direction of motion of the user's gaze across XR images. The motion of the user's gaze may be due to saccading of the user's eyes, smooth pursuit of a moving point in the environment by the user's eyes, vestibulo-ocular reflex (VOR) of the user's eyes, and the like. VOR can be modelled when motion of the HMD is known (for example, using a headset pose tracking apparatus).

Optionally, the predefined threshold angle lies in a range of 0.5 degrees to 89 degrees. More optionally, the predefined threshold angle lies in a range of 0.5 degrees to 45 degrees. Yet more optionally, the predefined threshold angle lies in a range of 0.5 degrees to 30 degrees. For example, the predefined threshold angle may be from 0.5, 1, 2, 3, 4, 5, 10, 15, 20, 25, 30, 35, 40, 45, 50, 55, 60, 65, 70, 75, 80 or 85 degrees up to 1, 2, 3, 4, 5, 10, 15, 20, 25, 30, 35, 40, 45, 50, 55, 60, 65, 70, 75, 80, 85 or 89 degrees.

It will be appreciated that the given inlying pixel is optionally discarded (namely, culled) from said set, when the angle between the motion vector of the corresponding 3D point and the motion vector of the user's gaze exceeds the predefined threshold angle. The angle between said motion vectors exceeding the predefined threshold angle indicates that there is a considerable motion difference (namely, a motion mismatch) between said motion vectors. This means that the user's gaze is not following the corresponding 3D point in the environment. This process of discarding to inlying pixel(s) based on the motion difference between said motion vectors is performed prior to computation of probabilities of the user focussing on the inlying pixel of the set.

Optionally, the at least one processor is configured to:
determine a motion vector of a three-dimensional point in the environment that is represented by the given inlying pixel;
determine a motion vector of the user's gaze; and
compute the probability of the user focussing on the given inlying pixel, based on a comparison between the motion vector of the three-dimensional point and the motion vector of the user's gaze.

Optionally, in this regard, the probability is computed based on a difference in the motion vector of the 3D point and the motion vector of the user's gaze. The probability is inversely related to the angle between the motion vector of the 3D point and the motion vector of the user's gaze. In other words, smaller the angle between said motion vectors, greater is the probability of the user focussing on the given inlying pixel, and vice versa. Therefore, the probability is computed based on an extent of motion matching. The probability may, for example be calculated as a function of the angle between the aforesaid motion vectors, said angle being indicative of the comparison between the aforesaid motion vectors. Mathematically, $$probability = \exp(-motiondifference \cdot length(\ ) * bias)$$

Use of these motion vectors (or specifically, the differences in these motion vectors) enables in using moving virtual objects as calibration targets (for example, during a smooth pursuit of the user's eyes).

Stereo Focussing

Optionally, the at least one processor is configured to compute the probability of the user focussing on the given inlying pixel, based on a comparison between an optical depth of the given inlying pixel and the optical depth of the gaze location. In this regard, the probability is computed based on a difference in the optical depths of the given inlying pixel and the gaze location. The probability is inversely related to the difference in the optical depths of the given inlying pixel and the gaze location. In other words, smaller the difference in the optical depths, greater is the probability of the user focussing on the given inlying pixel, and vice versa.

Moreover, optionally, the at least one processor is configured to compute the probability of the user focussing on the given inlying pixel, based on a comparison between a position of the given inlying pixel and the position of the gaze location. In this regard, the probability is computed based on a difference in the positions of the given inlying pixel and the gaze location. The probability is inversely related to the difference in the positions of the given inlying pixel and the gaze location. In other words, smaller the difference in the positions, greater is the probability of the user focussing on the given inlying pixel, and vice versa.

Saliency of Features

Optionally, the at least one processor is configured to:
extract features from the extended-reality image; and
compute the probability of the user focussing on the given inlying pixel, based on whether or not the given inlying pixel overlaps with any of the extracted features, and optionally based on a type of feature with which the given inlying pixel overlaps.

Optionally, the at least one processor is configured to employ at least one feature-extraction algorithm to extract features from the XR image. The at least one feature-extraction algorithm may be employed separately for all colour channels associated with the at least one light source as well as optical depth. Examples of the features include, but are not limited to, edges, corners, blobs, ridges, interior features, and texture detail. It will be appreciated that feature extraction is well-known in the art. Examples of the at least one feature extraction algorithm include, but are not limited to:

- an edge-detection algorithm (for example, such as a biased Sobel gradient estimator, a Canny edge detector, Deriche edge detector, and the like),
- a corner-detection algorithm (for example, such as Harris & Stephens corner detector, Shi-Tomasi corner detector, Features from Accelerated Segment Test (FAST) corner detector, and the like),
- a blob-detection algorithm (for example, such as Laplacian of Gaussian (LoG)-based blob detector, Difference of Gaussians (DoG)-based blob detector, Maximally Stable Extremal Regions (MSER) blob detector, and the like),
- a feature descriptor algorithm (for example, such as Binary Robust Independent Elementary Features (BRIEF), Gradient Location and Orientation Histogram (GLOH), Histogram of Oriented Gradients (HOG), and the like), and
- a feature detector algorithm (for example, such as Scale-Invariant Feature Transform (SIFT), Oriented FAST and rotated BRIEF (ORB), Speeded Up Robust Features (SURF), and the like).

Optionally, the probability of the user focussing on the given inlying pixel is high when it is determined that the given inlying pixel overlaps with any of the extracted features. The user is more likely to focus on pixels that overlap with the extracted features, as the features in the XR image are visually alluring (namely, have high saliency), as compared to pixels that do not overlap with the extracted features. In this way, the probability is determined based on saliency of features.

It will be appreciated that certain types of features may be more likely to be focussed on, by the user, as compared to other types of features. In other words, certain types of features may have higher saliency, as compared to other types of features. For example, the user is more likely to focus on an edge, a corner, or a high-frequency texture detail as compared to interior features or low-frequency texture detail, since the former types of features are more visually alluring compared to the latter. In such an example, the probability of the user focussing on the given inlying pixel that overlaps with any of the former types of features is higher than the probability of the user focussing on the given inlying pixel that overlaps with any of the latter types of features.

Optionally, the at least one processor is configured to assign a saliency score to the given inlying pixel, based on the type of feature with which the given inlying pixel overlaps. This saliency score is used as a weighting factor for computing the probability of the user focussing on the given inlying pixel, thereby optionally improving the probability distribution. Inlying pixels corresponding to the certain types of features have a higher likelihood of being focussed on, and are assigned higher saliency scores (and therefore, have higher probabilities) as compared inlying pixels corresponding to the other types of features. Optionally, the saliency score lies in a range of 0 to 1. For example, the saliency score may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1. Other ranges of the saliency score are also feasible. Optionally, when assigning the saliency score to the given inlying pixel, the at least one processor is configured to employ at least one of: a psycho-visual factor, an artificial intelligence (AI) algorithm. When employing the AI algorithm, a neural network that is trained (using requisite training data) may be employed.

Optionally, the at least one processor is configured to:
split the inlying pixels of said set into a first cluster and a second cluster, wherein probabilities of the user focussing on inlying pixels of the first cluster are higher than probabilities of the user focussing on inlying pixels of the second cluster; and
assign weights to the inlying pixels of the first cluster based on their corresponding probabilities, wherein, when identifying the at least one inlying pixel as the calibration target, the at least one processor is configured to compute a weighted average of corresponding positions of the inlying pixels of the first cluster in the environment using the assigned weights, wherein the at least one inlying pixel that is identified as the calibration target corresponds to the weighted average of the positions of the inlying pixels of the first cluster.

Optionally, the at least one processor is configured to employ a clustering to algorithm to create the first cluster and the second cluster. The clustering algorithm implements dynamic inlying pixel clustering, and also facilitates in keeping overall calibration data manageable. The clustering algorithm may, for example, be a K-means clustering algorithm. Clustering algorithms are well-known in the art.

Optionally, the at least one processor is configured to assign a given inlying pixel to a given cluster using a clustering threshold, wherein when the probability of the user focussing on the given inlying pixel is greater than or equal to the clustering threshold, the given inlying pixel is assigned to the first cluster, and when the probability of the user focussing on the given inlying pixel is lesser than the clustering threshold, the given inlying pixel is assigned to the second cluster. Optionally, the clustering threshold lies in a range of 0.5 to 0.8. The clustering threshold may, for example, be from 0.5, 0.55, 0.6, 0.65, 0.7 or 0.75 up to 0.55, 0.6, 0.65, 0.7, 0.75 or 0.8.

Optionally, a given weight that is assigned to a given inlying pixel of the first cluster is directly related to a probability of the user focussing on the given inlying pixel. In other words, greater the probability of the user focussing on the given inlying pixel of the first cluster, greater is the weight assigned to the given inlying pixel, and vice versa. Optionally, the at least one inlying pixel whose position in the environment lies nearest to the weighted average of the positions of the inlying pixels in the first cluster, is identified as the calibration target. The position of such inlying pixel(s) could be exactly the same as the weighted average or could be nearest to the weighted average (as compared to positions of other inlying pixel(s) of the first cluster). It will be appreciated that the weighted average of the positions of the inlying pixels of the first cluster provides an accurate estimate of the gaze directions of the user, as well as a tight error bound for identifying the calibration target.

Optionally, the at least one processor is configured to:
store information indicative of positions of a plurality of calibration targets, a position of a given calibration target being represented by position coordinates of the given calibration target in a coordinate space;
divide the coordinate space into a plurality of grids; and
maintain at most a predefined number of calibration targets per grid.

Optionally, the information indicative of positions of the plurality of calibration targets is stored at a data repository of the display apparatus, the data repository being communicably coupled to the at least one processor. The data repository is implemented as a memory of the HMD, a memory of the computer coupled to the HMD, a cloud-based memory, or similar. Optionally, the information indicative of the positions of the plurality of calibration targets comprises position coordinates of the plurality of targets in the coordinate space.

It will be appreciated that a given grid in the plurality of grids could be either a 2D grid or a 3D grid. In some implementations, a number of grids in the plurality of grids is fixed, whereas in other implementations, a number of grids in the plurality of grids is dynamic. In these other implementations, the number of grids may be user configurable, or may be determined by the at least one processor based on a number of calibration targets in the plurality of calibration targets.

Optionally, the plurality of grids are equally-sized. Alternatively, optionally, the plurality of grids are unequally-sized. As an example, the plurality of grids may be equally-sized, each grid including N*N pixels, where N could, for example, be 20, 30, 40, 50, 60, 70, 80, 90, 100, 150, 200, and so on.

Optionally, the predefined number of calibration targets per grid lies in a range of 1 to 5. For example, the predefined number of calibration targets per grid may be from 1, 2, 3 or 4 up to 2, 3, 4 or 5. Other predefined numbers lying outside this range are also feasible. This guarantees that each grid in the plurality of grids is populated. It will be appreciated that maintaining the plurality of calibration targets in a grid-wise manner enables in efficiently organizing said calibration targets. Resultantly, information indicative of positions of a certain (small) number of calibration targets is constantly maintained at all times.

Optionally, the division of the coordinate space into the plurality of grids is initialized using the existing calibration model. In this way, the existing calibration model is taken into account gracefully, to generate the new calibration model. Optionally, when maintaining at most the predefined number of calibration targets per grid, the at least one processor employs weighted merging of data from the existing calibration model and data from the new calibration model. This weighted merging may employ a lerp function for interpolating at least one of: the position coordinates of the given calibration target, a weight assigned to the given calibration target, eye features corresponding to the given calibration target. If any data value from the new calibration model conflicts with any data value from the existing calibration model in the same grid, the data value from the existing calibration model is replaced by the data value from the new calibration model (to account for camera and/or HMD shifting in time).

Optionally, upon updating the existing calibration model by fitting observations to the new calibration model, calibration targets in the plurality of grids that correspond to the existing calibration model are replaced with calibration targets obtained by applying an inverse of the fitting technique employed during updating of the existing calibration model. This fixes (i.e., removes) outlier observations in the plurality of grids.

In an embodiment, the coordinate space is divided into the plurality of grids non-linearly, wherein a number of grids in a central portion of the coordinate space is greater than a number of grids in a peripheral portion of the coordinate space, and wherein the central portion of the coordinate space corresponds to an optical centre of the at least one light source. Optionally, in this regard, the division of the coordinate space into the plurality of grids is performed by utilizing a non-linear curve. This non-linear curve optionally mimics a resolution curve of a human eye. Generally, the user's gaze is directed towards a centre of his/her field of view, which also corresponds to the optical centre of the at least one light source. When the user wishes to view a point in a periphery of his/her field of view, the user typically turns his/her head in a manner that said point lies at the centre of his/her current field of view. The central portion of the user's field of view is generally resolved to a much greater degree of visual detail by the user's eyes, as compared to the peripheral portion of the user's field of view. By dividing the coordinate space in the aforesaid non-linear manner, an arrangement of the plurality of grids emulates the resolution curve of the human eye, to provide a higher accuracy of calibration (using a higher number of calibration targets) in the central portion of the coordinate space, where this higher accuracy is actually needed to emulate fixed foveation characteristics of the user.

Moreover, optionally, the plurality of calibration targets are weighted by their inverse distance to the central portion of the coordinate space. Lesser the distance of a given calibration target to the central portion of the coordinate space, greater is a weight assigned to the given calibration target. This is because observations closer to the central portion of the coordinate space tend to be more accurate and reliable.

In another embodiment, the coordinate space is divided into the plurality of grids linearly, wherein a number of grids is uniform across the coordinate space.

Optionally, the at least one processor is configured to:
detect whether or not the user's eyes are blinking or saccading; and
when it is detected that the user's eyes are blinking or saccading, switch from the existing calibration model to the new calibration model.

Optionally, the at least one processor is configured to analyse the at least one eye image to detect whether or not the user's eyes are blinking or saccading. When the at least one eye image of the user's eyes do not represent the eye features therein, it is detected that the user's eyes are blinking. When the at least one eye image of the user's eyes represents movement of the eye features, it is detected that the user's eyes are saccading. Additionally or alternatively, optionally, at least one processor obtains information indicative of occurrence of blinking or saccading of the user's eyes, from an eye-blink sensor and/or sensors of the display apparatus, to detect whether or not the user's eyes are blinking or saccading.

Optionally, the switch from the existing calibration model to the new calibration model is made during the blinking or saccading of the user's eyes. In this way, the switch is imperceptible to the user. Optionally, the at least one processor is configured to interpolate between the existing calibration model and the new calibration model. Optionally, in this regard, the at least one processor switches from the existing calibration model to an intermediate calibration model corresponding to the interpolation, and then from the intermediate calibration model to the new calibration model. This enables gradual switching over a period of time from the existing calibration model to the new calibration model by way of interpolation, and this gradual switching is easy to perform, whilst also being imperceptible to the user.

Optionally, the at least one processor is configured to:
assign a timestamp to the calibration target;
detect, based on the assigned timestamp, whether or not an expiration time has elapsed for the calibration target; and
when it is detected that the expiration time has elapsed, discard the calibration target.

In this regard, the calibration target is discarded upon elapsing of its expiration time, in order to ensure accuracy of the new calibration model. This allows the new calibration model to adapt dynamically to changing usage scenarios (for example, such as shifting of the HMD). Optionally, the timestamp is assigned to the calibration target upon identification of the calibration target. The "expiration time" of the calibration target refers to a time, upon elapsing of which, the calibration target is considered outdated, and therefore unsuitable for calibration purposes. In some embodiments, the expiration time is fixed (namely, constant), whereas in other embodiments, the expiration time is dynamic. In practice, newer calibration targets typically replace older calibration targets in their immediate vicinity. When the newer calibration targets and the older calibration targets are very similar, the newer calibration targets may be merged with the older calibration targets.

Furthermore, the present disclosure also relates to the method as described above. Various embodiments and variants disclosed above apply mutatis mutandis to the method.

Optionally, the method further comprises:
determining, for a given inlying pixel of said set, a motion vector of a corresponding three-dimensional point in the environment that is represented by the given inlying pixel;
determining a motion vector of the user's gaze;
detecting whether or not an angle between the motion vector of the corresponding three-dimensional point and the motion vector of the user's gaze exceeds a predefined threshold angle; and
when it is detected that the angle between the motion vector of the corresponding three-dimensional point and the motion vector of the user's gaze exceeds the predefined threshold angle, discarding the given inlying pixel from said set.

Optionally, the method further comprises:
determining a motion vector of a three-dimensional point in the environment that is represented by the given inlying pixel;
determining a motion vector of the user's gaze; and
computing the probability of the user focussing on the given inlying pixel, based on a comparison between the motion vector of the three-dimensional point and the motion vector of the user's gaze.

Optionally, the method further comprises computing the probability of the user focussing on the given inlying pixel, based on a comparison between an optical depth of the given inlying pixel and the optical depth of the gaze location.

Optionally, the method further comprises:
extracting features from the extended-reality image; and
computing the probability of the user focussing on the given inlying pixel, based on whether or not the given inlying pixel overlaps with any of the extracted features, and optionally based on a type of feature with which the given inlying pixel overlaps.

Optionally, the method further comprises:
splitting the inlying pixels of said set into a first cluster and a second cluster, wherein probabilities of the user focussing on inlying pixels of the first cluster are higher than probabilities of the user focussing on inlying pixels of the second cluster; and
assigning weights to the inlying pixels of the first cluster based on their corresponding probabilities,
wherein the step of identifying the at least one inlying pixel as the calibration target comprises computing a weighted average of corresponding positions of the inlying pixels of the first cluster in the environment using the assigned weights, wherein the at least one inlying pixel that is identified as the calibration target corresponds to the weighted average of the positions of the inlying pixels of the first cluster.

Optionally, the method further comprises:
storing information indicative of positions of a plurality of calibration targets, a position of a given calibration target being represented by position coordinates of the given calibration target in a coordinate space;
dividing the coordinate space into a plurality of grids; and
maintaining at most a predefined number of calibration targets per grid.

Optionally, in the method, the coordinate space is divided into the plurality of grids non-linearly, wherein a number of grids in a central portion of the coordinate space is greater than a number of grids in a peripheral portion of the coordinate space, and wherein the central portion of the coordinate space corresponds to an optical centre of the at least one light source.

Optionally, the method further comprises:
detecting whether or not the user's eyes are blinking or saccading; and
when it is detected that the user's eyes are blinking or saccading, switching from the existing calibration model to the new calibration model.

Optionally, the method further comprises:
assigning a timestamp to the calibration target;
detecting, based on the assigned timestamp, whether or not an expiration time has elapsed for the calibration target; and
when it is detected that the expiration time has elapsed, discarding the calibration target.

DETAILED DESCRIPTION OF THE DRAWINGS

Referring to FIG. 1, illustrated is a block diagram of an architecture of a display apparatus 100, in accordance with an embodiment of the present disclosure. The display apparatus 100 comprises at least one light source (depicted as a light source 102), at least one camera (depicted as a camera 104), and at least one processor (depicted as a processor 106). The processor 106 is coupled to the light source 102 and the camera 104.

Figure 2A:
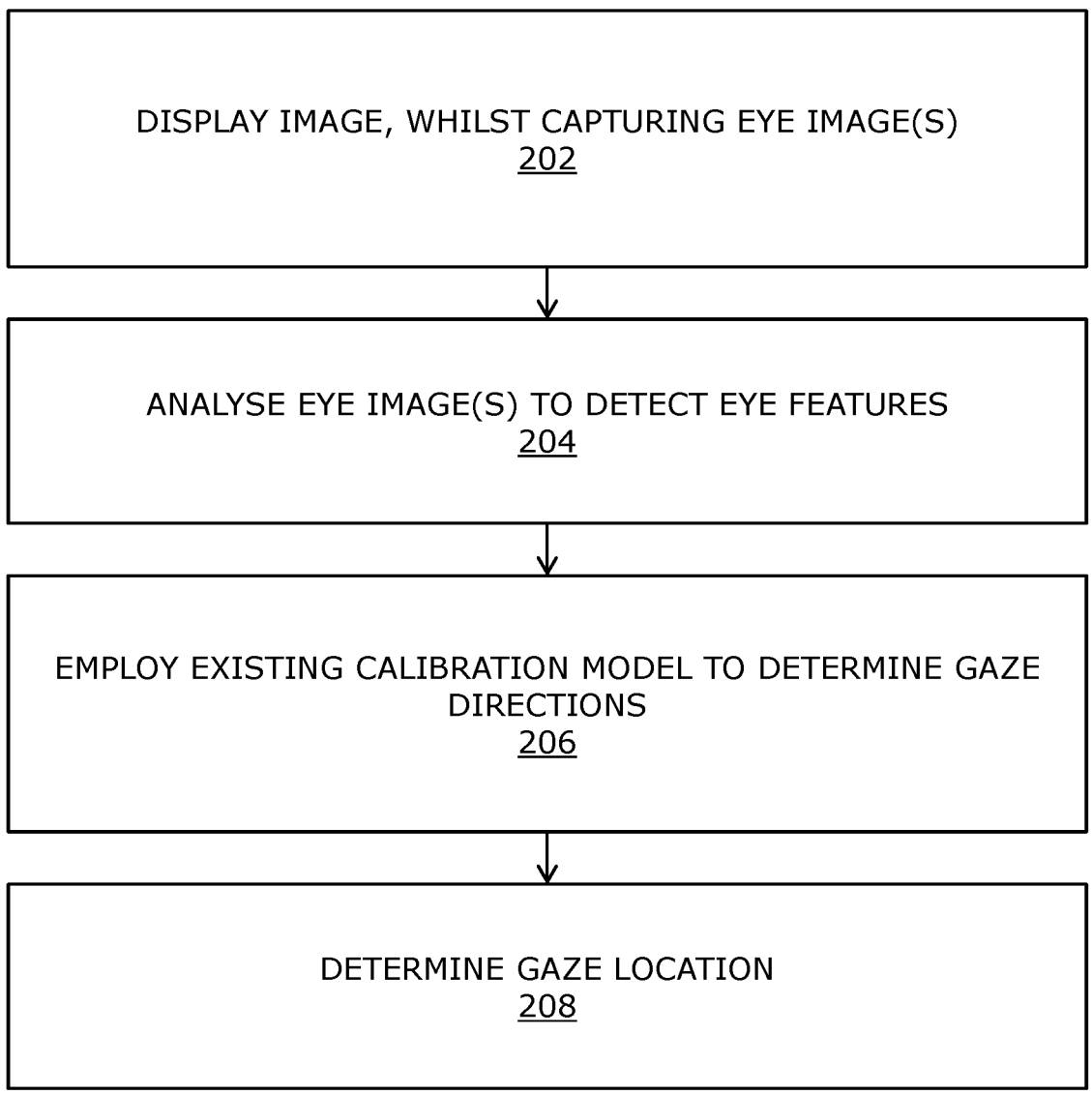
FIGS. 2A and 2B illustrate steps of a method for calibration of gaze tracking, in accordance with an embodiment of the present disclosure.
Figure 2B:
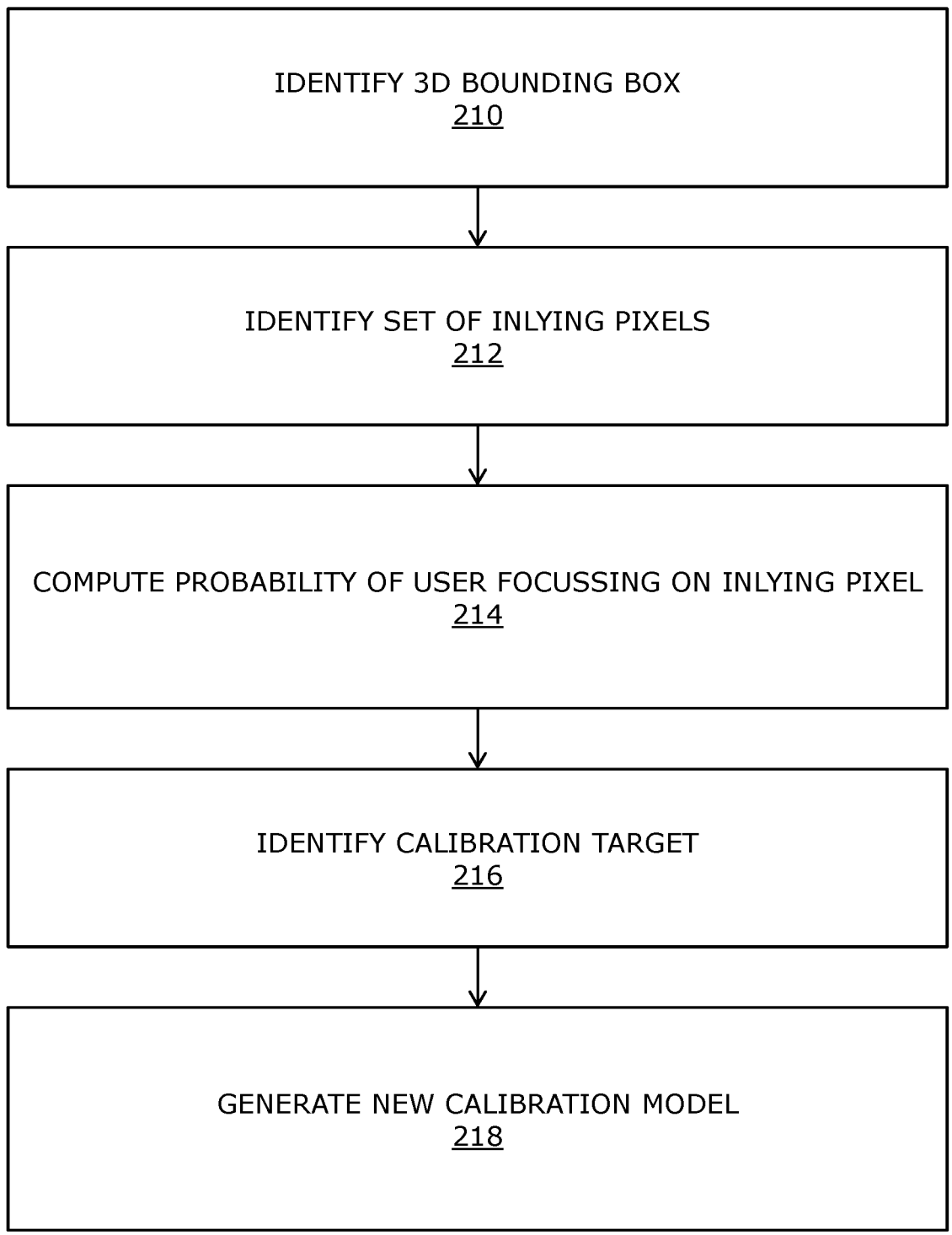

Referring to FIGS. 2A and 2B, illustrated are steps of a method for calibration of gaze tracking, in accordance with an embodiment of the present disclosure. At step 202, an extended-reality image is displayed via at least one light source for presentation to a user, whilst capturing at least one eye image of the user's eyes via at least one camera. At step 204, the at least one eye image is analysed to detect eye features therein. At step 206, an existing calibration model is employed to determine gaze directions of the user's eyes, based on the detected eye features. At step 208, a gaze location at which the user is gazing is determined, based on an intersection of the gaze directions. At step 210, a three-dimensional bounding box is identified at the gaze location within an environment being presented via the extended-reality image, based on a position and an optical depth of the gaze location within the environment. At step 212, a set of inlying pixels of the extended-reality image that lie within the three-dimensional bounding box is identified, based on optical depths of pixels in the extended-reality image. At step 214, a probability of the user focussing on a given inlying pixel of said set is computed and a probability distribution of probabilities computed for the inlying pixels of said set is generated. At step 216, at least one inlying pixel in said set is identified as a calibration target, based on the probability distribution. At step 218, a position of the calibration target is mapped to the detected eye features, so as to update the existing calibration model to generate a new calibration model.

The steps 202, 204, 206, 208, 210, 212, 214, 216 and 218 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:
1. A display apparatus comprising:
at least one light source;
at least one camera; and
at least one processor configured to:
display an extended-reality image via the at least one light source for presentation to a user, whilst capturing at least one eye image of the user's eyes via the at least one camera;
analyse the at least one eye image to detect eye features therein;
employ an existing calibration model to determine gaze directions of the user's eyes, based on the detected eye features;
determine a gaze location at which the user is gazing, based on an intersection of the gaze directions;
identify a three-dimensional bounding box at the gaze location within an environment being presented via the extended-reality image, based on a position and an optical depth of the gaze location within the environment;
identify a set of inlying pixels of the extended-reality image that lie within the three-dimensional bounding box, based on optical depths of pixels in the extended-reality image;
compute a probability of the user focussing on a given inlying pixel of said set and generate a probability distribution of probabilities computed for the inlying pixels of said set;
identify at least one inlying pixel in said set as a calibration target, based on the probability distribution; and
map a position of the calibration target to the detected eye features, so as to update the existing calibration model to generate a new calibration model.

2. The display apparatus of claim 1, wherein the at least one processor is configured to:
determine, for a given inlying pixel of said set, a motion vector of a corresponding three-dimensional point in the environment that is represented by the given inlying pixel;
determine a motion vector of the user's gaze;
detect whether or not an angle between the motion vector of the corresponding three-dimensional point and the motion vector of the user's gaze exceeds a predefined threshold angle; and when it is detected that the angle between the motion vector of the corresponding three-dimensional point and the motion vector of the user's gaze exceeds the predefined threshold angle, discard the given inlying pixel from said set.

3. The display apparatus of claim 1, wherein the at least one processor is configured to:
determine a motion vector of a three-dimensional point in the environment that is represented by the given inlying pixel;
determine a motion vector of the user's gaze; and
compute the probability of the user focussing on the given inlying pixel, based on a comparison between the motion vector of the three-dimensional point and the motion vector of the user's gaze.

4. The display apparatus of claim 1, wherein the at least one processor is configured to compute the probability of the user focussing on the given inlying pixel, based on a comparison between an optical depth of the given inlying pixel and the optical depth of the gaze location.

5. The display apparatus of claim 1, wherein the at least one processor is configured to:
extract features from the extended-reality image; and
compute the probability of the user focussing on the given inlying pixel, based on whether or not the given inlying pixel overlaps with any of the extracted features, and optionally based on a type of feature with which the given inlying pixel overlaps.

6. The display apparatus of claim 1, wherein the at least one processor is configured to:
split the inlying pixels of said set into a first cluster and a second cluster, wherein probabilities of the user focussing on inlying pixels of the first cluster are higher than probabilities of the user focussing on inlying pixels of the second cluster; and
assign weights to the inlying pixels of the first cluster based on their corresponding probabilities,
wherein, when identifying the at least one inlying pixel as the calibration target, the at least one processor is configured to compute a weighted average of corresponding positions of the inlying pixels of the first cluster in the environment using the assigned weights, wherein the at least one inlying pixel that is identified as the calibration target corresponds to the weighted average of the positions of the inlying pixels of the first cluster.

7. The display apparatus of claim 1, wherein the at least one processor is configured to:
store information indicative of positions of a plurality of calibration targets, a position of a given calibration target being represented by position coordinates of the given calibration target in a coordinate space;
divide the coordinate space into a plurality of grids; and
maintain at most a predefined number of calibration targets per grid.

8. The display apparatus of claim 7, wherein the coordinate space is divided into the plurality of grids non-linearly, wherein a number of grids in a central portion of the coordinate space is greater than a number of grids in a peripheral portion of the coordinate space, and wherein the central portion of the coordinate space corresponds to an optical centre of the at least one light source.

9. The display apparatus of claim 1, wherein the at least one processor is configured to:
detect whether or not the user's eyes are blinking or saccading; and
when it is detected that the user's eyes are blinking or saccading, switch from the existing calibration model to the new calibration model.

10. The display apparatus of claim 1, wherein the at least one processor is configured to:
assign a timestamp to the calibration target;
detect, based on the assigned timestamp, whether or not an expiration time has elapsed for the calibration target; and
when it is detected that the expiration time has elapsed, discard the calibration target.

11. A method for calibration of gaze tracking, the method comprising:
displaying an extended-reality image via at least one light source for presentation to a user, whilst capturing at least one eye image of the user's eyes via at least one camera;
analysing the at least one eye image to detect eye features therein;
employing an existing calibration model to determine gaze directions of the user's eyes, based on the detected eye features;
determining a gaze location at which the user is gazing, based on an intersection of the gaze directions;
identifying a three-dimensional bounding box at the gaze location within an environment being presented via the extended-reality image, based on a position and an optical depth of the gaze location within the environment;
identifying a set of inlying pixels of the extended-reality image that lie within the three-dimensional bounding box, based on optical depths of pixels in the extended-reality image;
computing a probability of the user focussing on a given inlying pixel of said set and generating a probability distribution of probabilities computed for the inlying pixels of said set;
identifying at least one inlying pixel in said set as a calibration target, based on the probability distribution; and
mapping a position of the calibration target to the detected eye features, so as to update the existing calibration model to generate a new calibration model.

12. The method of claim 11, further comprising:
determining, for a given inlying pixel of said set, a motion vector of a corresponding three-dimensional point in the environment that is represented by the given inlying pixel;
determining a motion vector of the user's gaze;
detecting whether or not an angle between the motion vector of the corresponding three-dimensional point and the motion vector of the user's gaze exceeds a predefined threshold angle; and
when it is detected that the angle between the motion vector of the corresponding three-dimensional point and the motion vector of the user's gaze exceeds the predefined threshold angle, discarding the given inlying pixel from said set.

13. The method of claim 11, further comprising:
determining a motion vector of a three-dimensional point in the environment that is represented by the given inlying pixel;
determining a motion vector of the user's gaze; and
computing the probability of the user focussing on the given inlying pixel, based on a comparison between the motion vector of the three-dimensional point and the motion vector of the user's gaze.

14. The method of claim 11, further comprising computing the probability of the user focussing on the given inlying pixel, based on a comparison between an optical depth of the given inlying pixel and the optical depth of the gaze location.

15. The method of claim 11, further comprising:
extracting features from the extended-reality image; and
computing the probability of the user focussing on the given inlying pixel, based on whether or not the given inlying pixel overlaps with any of the extracted features, and optionally based on a type of feature with which the given inlying pixel overlaps.

16. The method of claim 11, further comprising:
splitting the inlying pixels of said set into a first cluster and a second cluster, wherein probabilities of the user focussing on inlying pixels of the first cluster are higher than probabilities of the user focussing on inlying pixels of the second cluster; and
assigning weights to the inlying pixels of the first cluster based on their corresponding probabilities,
wherein the step of identifying the at least one inlying pixel as the calibration target comprises computing a weighted average of corresponding positions of the inlying pixels of the first cluster in the environment using the assigned weights, wherein the at least one inlying pixel that is identified as the calibration target corresponds to the weighted average of the positions of the inlying pixels of the first cluster.

17. The method of claim 11, further comprising:
storing information indicative of positions of a plurality of calibration targets, a position of a given calibration target being represented by position coordinates of the given calibration target in a coordinate space;
dividing the coordinate space into a plurality of grids; and
maintaining at most a predefined number of calibration targets per grid.

18. The method of claim 17, wherein the coordinate space is divided into the plurality of grids non-linearly, wherein a number of grids in a central portion of the coordinate space is greater than a number of grids in a peripheral portion of the coordinate space, and wherein the central portion of the coordinate space corresponds to an optical centre of the at least one light source.

19. The method of claim 11, further comprising:
detecting whether or not the user's eyes are blinking or saccading; and
when it is detected that the user's eyes are blinking or saccading, switching from the existing calibration model to the new calibration model.

20. The method of claim 11, further comprising:
assigning a timestamp to the calibration target;
detecting, based on the assigned timestamp, whether or not an expiration time has elapsed for the calibration target; and
when it is detected that the expiration time has elapsed, discarding the calibration target.

* * * * *